(12) United States Patent
Dennis et al.

(10) Patent No.: US 7,142,892 B2
(45) Date of Patent: Nov. 28, 2006

(54) SYSTEMS, METHODS AND COMPUTER PROGRAM PRODUCTS FOR COMMUNICATING AMBER ALERTS TO A MOBILE WORKFORCE

(75) Inventors: Gary J. Dennis, Duluth, GA (US); James A. Page, Charlotte, NC (US); Robert M. Ingman, Peachtree City, GA (US); Steven L. McDonald, Stockbridge, GA (US); Billy D. Deen, Helena, AL (US); Frank P. May, Powder Springs, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 271 days.

(21) Appl. No.: 10/388,335

(22) Filed: Mar. 13, 2003

(65) Prior Publication Data

US 2004/0180683 A1 Sep. 16, 2004

(51) Int. Cl.
*H04M 1/00* (2006.01)
*H04M 3/16* (2006.01)

(52) U.S. Cl. ...................... 455/567; 455/411
(58) Field of Classification Search ................ 455/567, 455/411, 412.1, 412.2, 413, 414.1
See application file for complete search history.

(56) References Cited

U.S. PATENT DOCUMENTS

| | | | |
|---|---|---|---|
| 5,563,931 A | 10/1996 | Bishop et al. | |
| 6,028,514 A | 2/2000 | Lemelson et al. | |
| 6,731,238 B1* | 5/2004 | Johnson | 342/357.09 |
| 2003/0022684 A1 | 1/2003 | Seeger | |
| 2003/0030561 A1 | 2/2003 | Yafuso et al. | |
| 2003/0109245 A1 | 6/2003 | McCalmont et al. | |
| 2003/0121036 A1* | 6/2003 | Lock et al. | |
| 2003/0218535 A1* | 11/2003 | Khoshbin | |
| 2004/0103158 A1* | 5/2004 | Vella et al. | |
| 2004/0104808 A1* | 6/2004 | Khoshbin | |
| 2004/0143391 A1* | 7/2004 | King et al. | |
| 2005/0030977 A1* | 2/2005 | Casey et al. | |

OTHER PUBLICATIONS

*AMBER Plan—America's Missing: Broadcast Emergency Response*, http://www.missingkids.com/html/amberplan.html, 6 pages.
U.S. Appl. No. 10/702,845, filed Nov. 6, 2003, Macolly, Jr. et al.

* cited by examiner

*Primary Examiner*—William J. Deane, Jr.
(74) *Attorney, Agent, or Firm*—Myers Bigel Sibley & Sajovec, P.A.

(57) ABSTRACT

Mobile workforce communication systems include a mobile workforce dispatch system that is configured to dispatch the mobile workforce to perform tasks, and wireless terminals that are carried by the mobile workforce and are configured to communicate with the mobile workforce dispatch system to allow the mobile workforce to respond to dispatches. The mobile workforce dispatch system is further configured to accept an AMBER alert notification and to broadcast a mobile workforce AMBER alert message that includes a description of an abductee and identification of a location of an abduction, to the wireless terminals, so that the mobile workforce can be apprised of an AMBER alert.

39 Claims, 13 Drawing Sheets

US 7,142,892 B2

SYSTEMS, METHODS AND COMPUTER PROGRAM PRODUCTS FOR COMMUNICATING AMBER ALERTS TO A MOBILE WORKFORCE

FIELD OF THE INVENTION

This invention relates to communications systems, methods and computer program products and more particularly to systems, methods and computer program products for communicating an urgent bulletin in child abduction cases.

BACKGROUND OF THE INVENTION

In the fall of 2001, the National Center for Missing and Exploited Children (NCMEC) launched the AMBER plan: America's Missing: Broadcast Emergency Response, across the United States. As is well known to those having skill in the art, the AMBER plan is a voluntary partnership between law enforcement agencies and broadcasters to activate an urgent bulletin, known as an AMBER alert, in the most serious child-abduction cases. Broadcasters use the Emergency Alert System (EAS), formerly called the Emergency Broadcast System, to air a description of the abducted child and a suspected abductor. The goal of the AMBER alert is to instantly galvanize the entire community to assist in the search for and safe return of the child. The AMBER plan was created in 1996 as a legacy to nine year old Amber Hagerman who was kidnapped and brutally murdered while riding her bicycle in Arlington, Tex. In some states, the AMBER alert is known by a different name such as Levi's Call in Georgia, named for a young boy who was abducted and brutally murdered in 1997 and the Florida Emergency Missing Child Alert in Florida.

An AMBER plan is carried out once law enforcement has been notified about an abducted child and law enforcement determines that the case meets the AMBER plan's criteria for triggering an alert. If these criteria are met, alert information is put together for public distribution. This information can include descriptions and pictures of the missing child (abductee), the suspected abductor, a suspected vehicle and any other information that may help to identify the child and suspect. The information is then faxed to radio stations designated as primary stations under the EAS. The primary stations send the same information to area radio and television stations and cable systems via the EAS and it is immediately broadcast by participating stations to millions of listeners. Radio stations may interrupt programming to announce the alert and television stations and cable systems may run a "crawl" on the screen along with a picture of the child. Some states are also incorporating electronic highway billboards in their plans. The billboards, typically used to disseminate traffic information to drivers, can alert the public of abducted children, displaying pertinent information about the child, abductor or suspected vehicle that drivers might look for on highways. The AMBER plan is described in detail on the website MissingKids.com.

Some businesses also have attempted to participate in AMBER alerts. In particular, corporations that may have a mobile workforce may be able to assist in participating in an AMBER alert. For example, SBC Communications Inc. has been reported to provide AMBER alert paging codes to technician via pagers that are worn by technician in Texas and Connecticut. However, these simple paging codes may be of limited utility. Other companies, such as America Online, have placed AMBER alert messages on their public websites. However, this placement also may have limited utility.

SUMMARY OF THE INVENTION

Embodiments of the present invention provide mobile workforce communication systems that include a mobile workforce dispatch system that is configured to dispatch the mobile workforce to perform tasks, and a plurality of wireless terminals that are carried by the mobile workforce and are configured to communicate with the mobile workforce dispatch system to allow the mobile workforce to respond to dispatches. The mobile workforce dispatch system is further configured to accept an AMBER alert notification and to broadcast a mobile workforce AMBER alert message, which comprises a description of an abductee and an identification of a location of an abduction, to the plurality of wireless terminals in response thereto so that the mobile workforce can be apprised of an AMBER alert. By providing the AMBER alert message that includes a description of an abductee and an identification of a location of an abduction, to wireless terminals that are configured to communicate with the mobile workforce dispatch system, sufficient content may be provided to the mobile workforce to enable an educated response to the AMBER alert. It will be understood that as used herein, the term AMBER alert applies to any missing person alert system whether or not it is promulgated under the AMBER plan.

Some embodiments of the present invention may stem from a recognition that a corporation with a large mobile workforce such as a technician workforce, a sales workforce and/or other conventional mobile workforce, may greatly assist in the resolution of an AMBER alert when the mobile workforce is provided with sufficient information about the AMBER alert. This information may be provided to the mobile workforce via mobile workforce wireless terminals that are carried by the mobile workforce to provide hundreds, thousands or more additional sets of eyes and ears that can respond to an AMBER alert. Mobile workforce communication systems other than dispatch systems also may be used.

In other embodiments of the present invention, the mobile workforce dispatch system further includes a mobile workforce website that is accessible by the mobile workforce to assist the mobile workforce in performing tasks. In these embodiments, the mobile workforce AMBER alert message further comprises an identification of the mobile workforce website. The mobile workforce website is further configured to allow the mobile workforce to access the website from the plurality of wireless terminals in response to the mobile workforce AMBER alert message to obtain additional information concerning the AMBER alert. In some embodiments, the additional information concerning the AMBER alert comprises an image of the abductee. In other embodiments, the mobile workforce website is configured to allow the mobile workforce to access the website using a wire connection in response to the mobile workforce AMBER alert message to obtain additional information concerning the AMBER alert. In yet other embodiments, the wireless terminals are wireless laptop computers with Internet access that are configured to communicate bidirectionally with the mobile workforce dispatch system.

In still other embodiments of the present invention, the AMBER alert messages are tailored to a geographic region where the mobile workforce is located. Thus, in some embodiments, the mobile workforce dispatch system is configured to accept an AMBER alert notification that relates to a governmental jurisdiction and is further configured to broadcast a mobile workforce AMBER alert message only to selected ones of the plurality of wireless terminals that are located in the governmental jurisdiction. In still other embodiments, the mobile workforce dispatch system is configured to accept an AMBER alert email message from a law enforcement authority and is further configured to convert the AMBER alert email message into the mobile workforce AMBER alert message. In yet other embodiments, the mobile workforce dispatch system includes a Technician Systems Monitoring Center (TSMC). The TSMC is configured to accept an AMBER alert email message from a law enforcement authority and is further configured to convert the AMBER alert email message into the mobile workforce AMBER alert message.

In still other embodiments, the mobile workforce system is further configured to accept an AMBER alert cancellation notification and to broadcast an AMBER alert cancellation message to the plurality of wireless terminals in response thereto. In yet other embodiments, a plurality of pagers also are carried by the mobile workforce and are configured to receive paging codes from the mobile workforce dispatch system. The mobile workforce dispatch system is further configured to broadcast an AMBER alert paging code to the plurality of unidirectional pagers in response to receipt of the AMBER alert notification.

It will be understood that in some embodiments, the mobile workforce AMBER alert message comprises an alphanumeric message, for example up to 320 characters long, that includes a description of an abductee, identification of a location of an abduction, and identification of the website where more information about the abduction can be obtained. In other embodiments, the AMBER alert message may also include an image.

It will be understood that embodiments of the invention have been described above with respect to mobile workforce communication systems. However, other embodiments of the invention provide mobile workforce communications methods and/or computer program products and components thereof such as mobile workforce dispatch systems, methods and computer program products and wireless terminal operation methods and computer program products for a mobile workforce.

DETAILED DESCRIPTION

Figure 1:
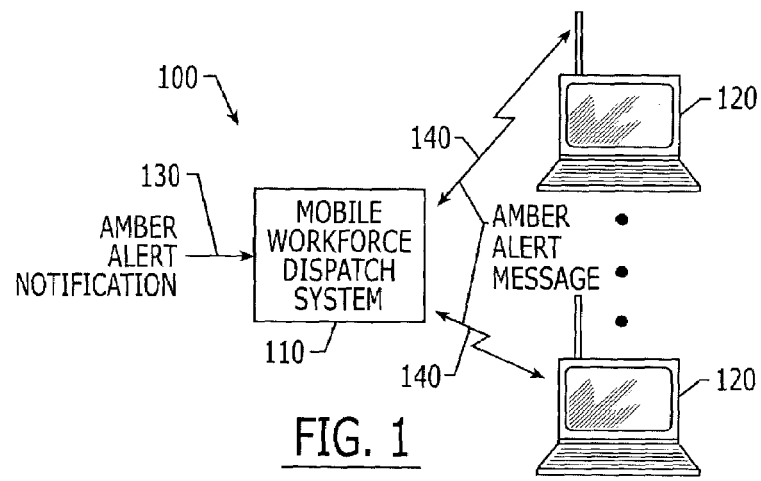
FIGS. 1–4 are block diagrams of mobile workforce communications systems, methods and/or computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of mobile workforce communications systems, methods and/or computer program products according to various embodiments of the present invention. As shown in FIG. 1, these mobile workforce communication systems, methods and/or computer program products 100 include a mobile workforce dispatch system 110 that is configured to dispatch the mobile workforce to perform tasks. It will be understood by those having skill in the art that the mobile workforce dispatch system 110 may provide other functionality to the mobile workforce, in addition to dispatch, to allow the mobile workforce to perform their tasks while being mobile. In other embodiments, mobile workforce communication systems other than dispatch systems may be provided.

A plurality of wireless terminals 120 are carried by the mobile workforce and are configured to communicate with the mobile workforce dispatch system 110 to allow the mobile workforce to respond to dispatches. In some embodiments, the wireless terminals 120 are wireless laptop computers. However, in other embodiments, the wireless terminals 120 can include a cellular radiotelephone with a multi-line display, a Personal Communications System (PCS) terminal that may combine a cellular radiotelephone with data processing, facsimile and/or data communications capabilities, a Personal Digital Assistant (PDA) that can include a radiotelephone, pager, Internet/intranet access, Web browser, organizer, calendar and/or a Global Positioning System (GPS) receiver, and conventional laptop, palmtop and/or pervasive computing devices that include wireless receivers.

Still referring to FIG. 1, the mobile workforce dispatch system 110 is further configured to accept an AMBER alert notification 130 and to broadcast a mobile workforce AMBER alert message 140 to the plurality of wireless terminals in response to the AMBER alert notification 130, so that the mobile workforce can be apprised of an AMBER alert. The mobile workforce AMBER alert message 140 includes a description of an abductee and an identification of a location of an abduction. Other information also may be provided. An example of a mobile workforce AMBER alert message 140 will be provided below.

Figure 2:
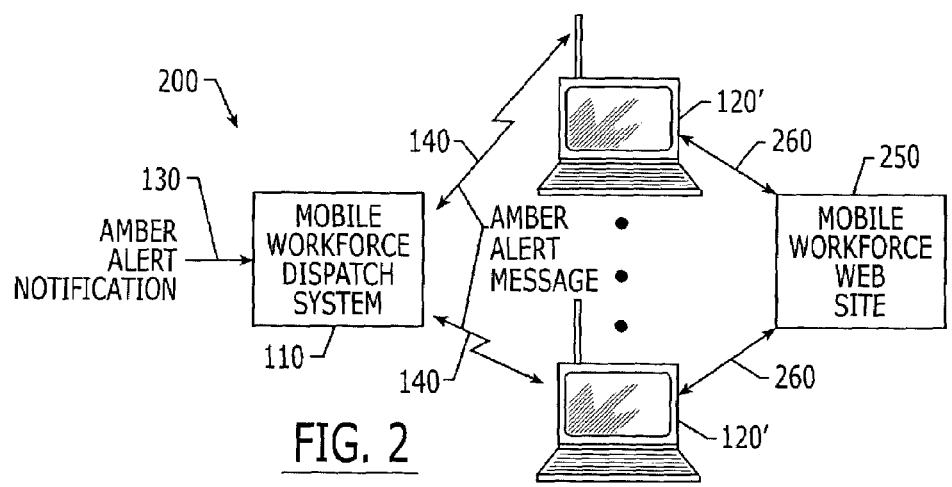

FIG. 2 is a block diagram of mobile workforce communication systems, methods and/or computer program products 200 according to other embodiments of the present invention. These mobile workforce communications systems, methods and/or computer program products 200 include a mobile workforce dispatch system 110 and a plurality of wireless terminals 120' that communicate with the mobile workforce dispatch system 110 and include Internet access. Embodiments of FIG. 2 also include a mobile workforce website 250 that is accessible by the mobile workforce using the wireless terminals 120 to assist the mobile workforce in performing tasks. The mobile workforce website 250 is further configured to allow the mobile workforce to access the website 250 from the plurality of wireless terminals 120 in response to the mobile workforce AMBER alert message 140, to obtain additional information concerning the AMBER alert. The access connection 260 between the wireless terminals 120 and the mobile workforce website may be wired, optical and/or wireless. In some embodiments, the mobile workforce AMBER alert message also includes an identification of the mobile workforce website 250, for example the Uniform Resource Locator (URL) of the mobile workforce website 250.

In other embodiments of the present invention, the mobile workforce dispatch system 110 is configured to accept an AMBER alert notification 130 that relates to a governmental jurisdiction, such as a particular state of the United States. The mobile workforce dispatch system 110 is further configured to broadcast a mobile workforce AMBER alert message 140 only to selected ones of the plurality of wireless terminals 120/120' that are located in the related governmental jurisdiction (for example, located in the related state). Accordingly, only those members of the wireless workforce that have a high likelihood of participating in an AMBER alert may be notified of the AMBER alert. In other embodiments of the invention, the AMBER alert notification 130 is an AMBER alert email message from a law enforcement authority. In these embodiments, the mobile workforce dispatch system 110 is further configured to convert the AMBER alert email message into the mobile workforce AMBER alert message 140. Conversion may be automatic or may include manual operations as will be described below.

Figure 3:
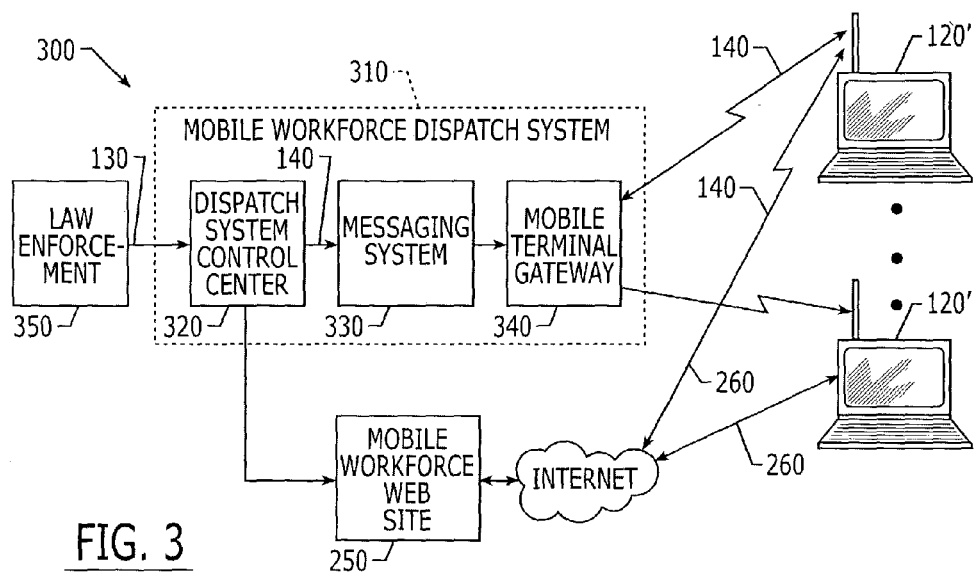

FIG. 3 is a block diagram of other mobile workforce communication systems, methods and/or computer program products according to other embodiments of the invention. These systems, methods and/or computer program products 300 include a mobile workforce dispatch system 310 that includes at least three component parts: a dispatch system control center 320, a messaging system 330 and a mobile terminal gateway 340. The dispatch control center 320 is configured to monitor and control the mobile workforce dispatch system 310. In these embodiments, an AMBER alert notification 130 in the form of an email message may be obtained from a law enforcement agency 350. The dispatch control center 320 is configured to accept the AMBER alert email message 130 from the law enforcement agency 350 and is further configured to convert the AMBER alert email message 130 into the mobile workforce AMBER alert message 140. The messaging system 330 is configured to distribute the AMBER alert notification message 140 as appropriate. The mobile terminal gateway 340 is configured to provide a gateway for bidirectional communications with the wireless terminals 120/120' including communication of the AMBER alert message.

Figure 4:
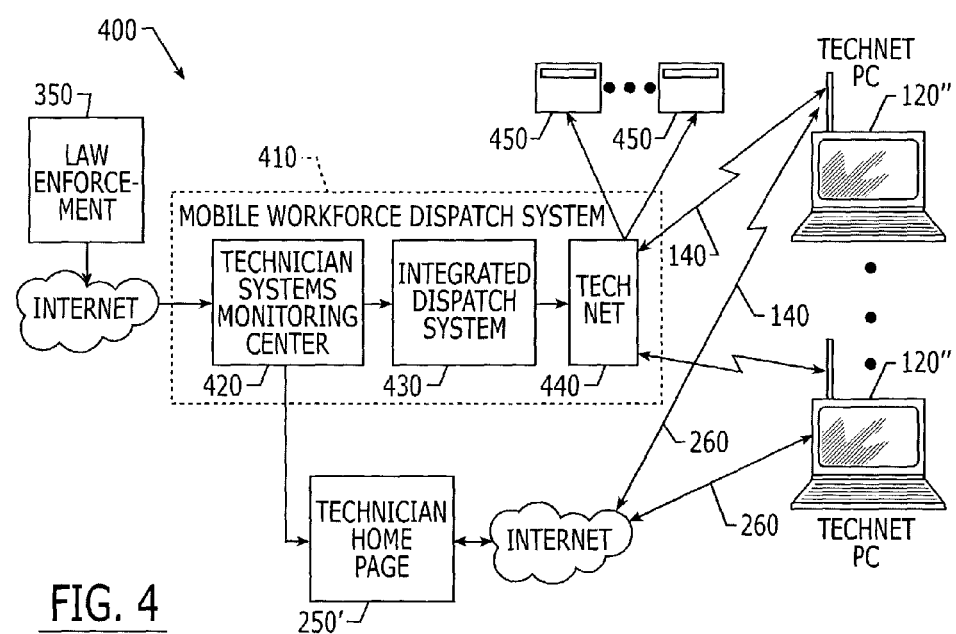

FIG. 4 illustrates other embodiments of mobile workforce communication systems, methods and/or computer program products according to the present invention. In these mobile workforce communication systems, methods and/or computer program products 400, the dispatch control center 320 is referred to as a Technician Systems Monitoring Center (TSMC) 420, and the messaging system 330 is referred to as an Integrated Dispatch System (IDS) 430. The mobile terminal gateway is referred to as TechNet 440 and the wireless terminals are referred to as TechNet PCs 120" to conform to conventions that are used in the telecommunications industry for communicating with a mobile workforce of telephone technician. The mobile workforce website 250 is also referred to as a technician home page 250'. As also shown in FIG. 4, a mobile workforce may be provided with a paging code that signifies an AMBER alert on unidirectional pagers 450. It will be understood that pagers 450 may be added to the embodiments of FIG. 1–3 as well.

In still other embodiments of the present invention, the mobile workforce dispatch system 110, 310, or 410 is further configured to accept an AMBER alert cancellation notification and to broadcast an AMBER alert cancellation message to the plurality of wireless terminals 120, 120', 120" in response thereto. Alert cancellation may be provided in any of the embodiments described herein.

Embodiments of the present invention can provide an AMBER alert message to a mobile workforce that can contain sufficient useful information for the mobile workforce to respond to the AMBER alert. Accordingly, the AMBER alert message includes at least a description of an abductee and an identification of a location of an abduction. The AMBER alert message also can include a description of a vehicle and identification of the mobile workforce website 250 where more information about the abduction can be obtained. Thus, the mobile workforce can immediately have at their disposal sufficient information to identify a person that may be involved in an abduction. In some embodiments, the AMBER alert message is a text message of up to 320 characters. In other embodiments, an image also may be included.

The mobile workforce website 250 and/or the technician home page 250' can include complete information on the AMBER alert. After receiving the AMBER alert message at the wireless terminal 120, 120', 120", a member of the mobile workforce can log on to the mobile workforce website 250 or technician home page 250' to obtain additional information about the AMBER alert.

Additional embodiments of the present invention will now be described with reference to FIG. 4. These embodiments include a mobile workforce dispatch system 410 that includes a Technician Systems Monitoring Center (TSMC) 420, an Integrated Dispatch System (IDS) 430, a TechNet system 440, TechNet PCs 120" and a technician home page 250' to conform to terminology that is used in the telecommunications industry. However, it will be understood that the embodiments that will be described below also are applicable to embodiments of FIGS. 1–3.

Figure 5:
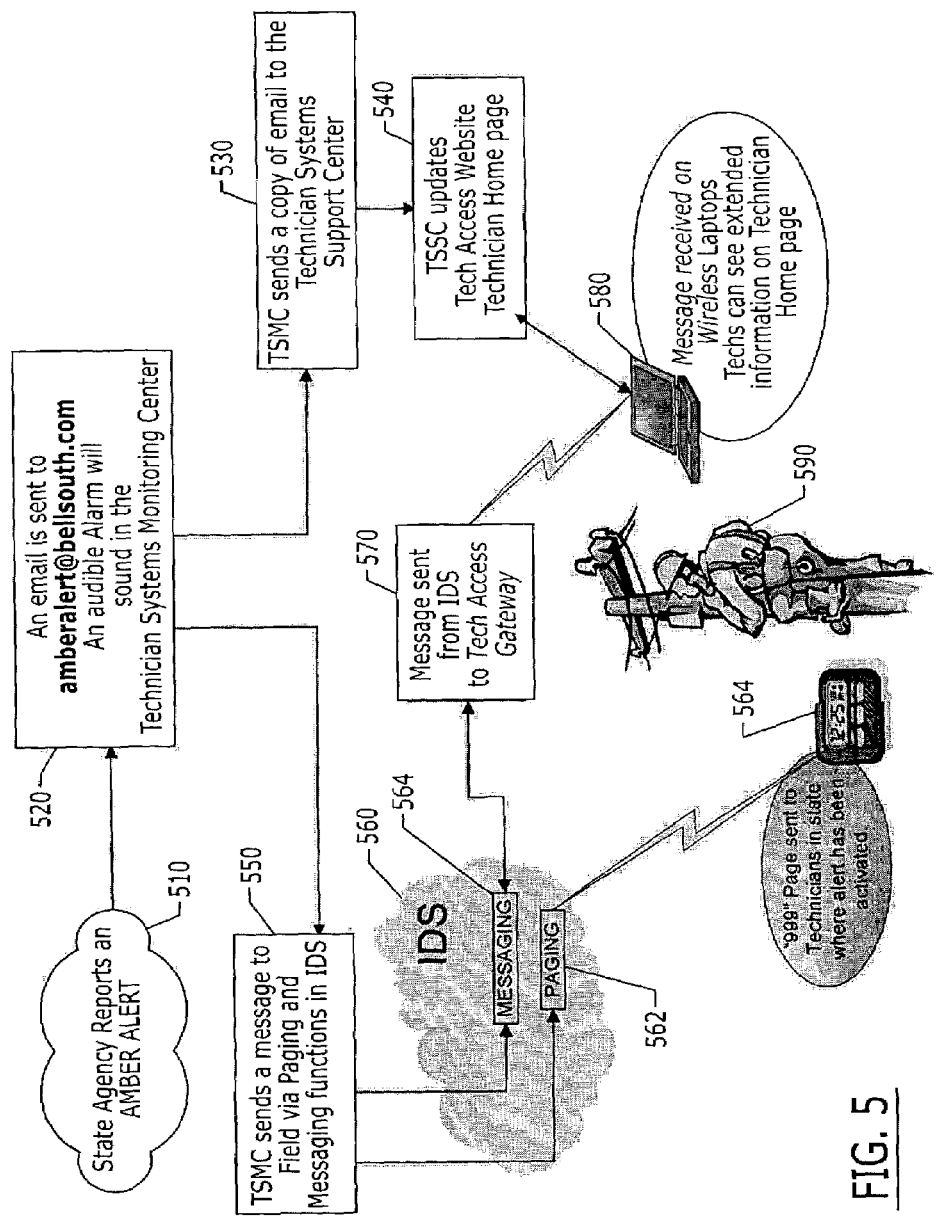
FIG. 5 is a block diagram that illustrates operations that may be performed by systems, methods and/or computer program products according to embodiments of the present invention.

FIG. 5 is a block diagram that illustrates operations that may be performed by systems, methods and/or computer program products according to embodiments of the present invention. As shown in FIG. 5 at Block 510, a state agency reports an AMBER alert by sending an email at Block 520 to a prescribed email address that is located at the TSMC. In some embodiments, as also shown in Block 520, an audible alarm will sound in the TSMC. At Block 530, the TSMC sends a copy of the email to a Technician Systems Support Center (TSSC), which is responsible for maintaining the technician home page. The TSSC updates the technician home page, also referred to as a Tech Access Website, at Block 540.

Referring again to Block 520, prior to, after, or simultaneously with sending the copy of the email to the TSCC at Block 530, the TSMC also sends a message to the mobile workforce, here, field technician, at Block 550 via the paging and messaging functions in the IDS 560. The paging function 562 sends a page to pagers 564. For example, a numeric "999" page or an alphanumeric "999_AMBER" page is sent to technician in the state where the alert has been activated. The messaging function 564 sends a message from IDS 560 to the Tech Access Gateway at Block 570. This message is received on the wireless laptops 580. The technician 590 can also see extended information on the technician home page at Block 540.

Figure 6:
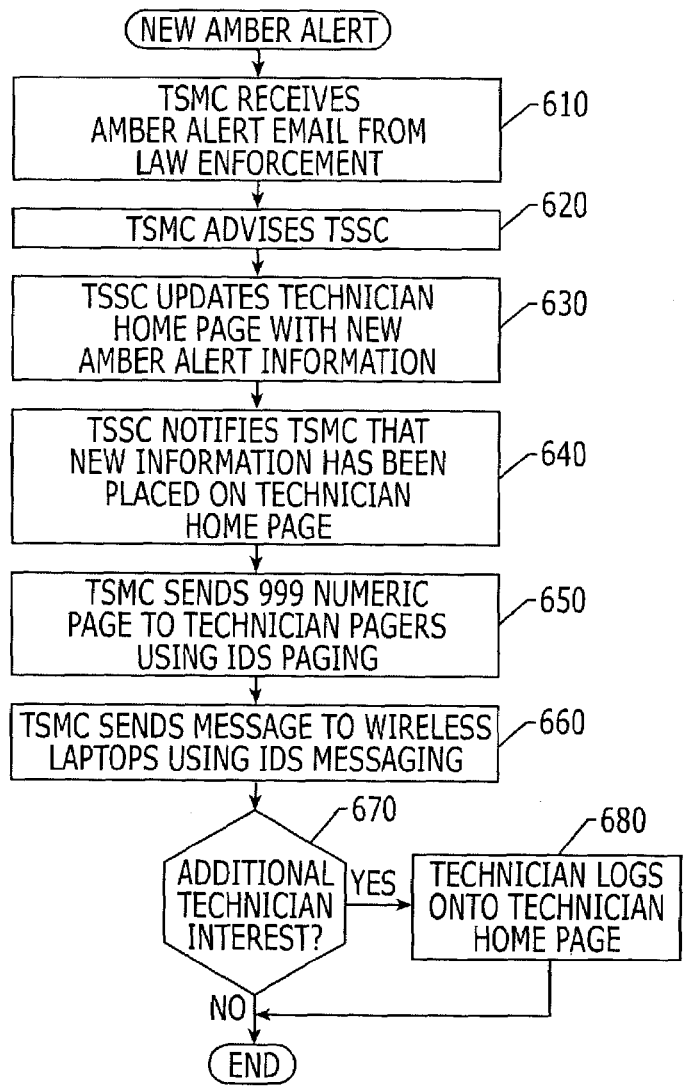
FIGS. 6–8 are flowcharts of operations that may be performed to provide a new AMBER alert, to update an AMBER alert and to cancel an AMBER alert, respectively, according to embodiments of the present invention.

FIG. 6 is a flowchart of operations that may be performed by mobile workforce communications systems, methods and/or computer program products according to embodiments of the present invention to provide a new AMBER alert. These operations may be performed by, for example, systems, methods and/or computer program products of FIGS. 1–5. As shown in FIG. 6 at Block 610, the TSMC receives an AMBER alert email from law enforcement. At Block 620, the TSMC advises the TSSC. At Block 630, the TSSC updates the technician home page with the new AMBER alert information. At Block 640, the TSSC notifies the TSMC that the new information has been placed on the technician home page. At Block 650, the TSMC sends a 999 numeric page to the technician pagers using IDS paging function, and at Block 660, the TSMC sends a message to the wireless laptops using the IDS messaging function. In some embodiments, the message may have a maximum of 360 characters and may include the location of the alert, a brief description of the child and the URL of the home page. At Block 670, if the technician has additional interest in finding out about the AMBER alert, for example, because the technician is proximate to the location, then the technician logs onto the technician home page at Block 680.

Figure 7:
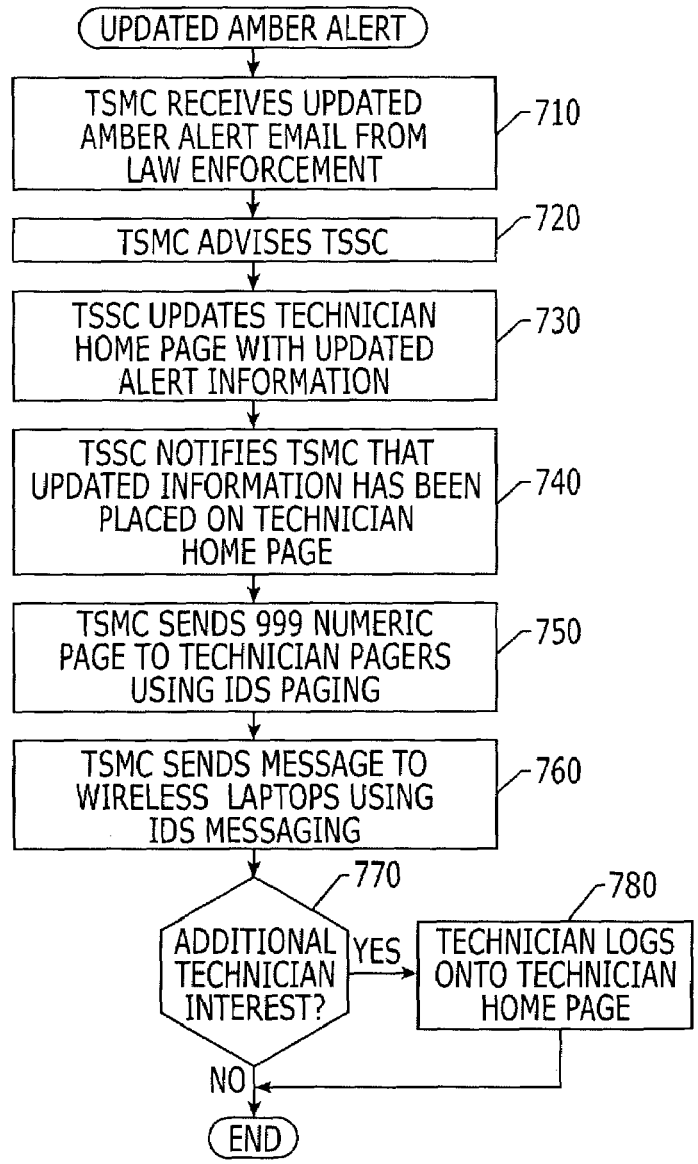

FIG. 7 is a flowchart of operations that may be performed to update an AMBER alert. These operations may be performed using systems, methods and/or computer program products of FIGS. 1–5, for example. Referring to FIG. 7, at Block 710, the TSMC receives an updated AMBER alert email from law enforcement. At Block 720 the TSMC advises the TSSC. At Block 730, the TSSC updates the technician home page with updated alert information. At Block 740, the TSSC notifies the TSMC that the updated information has been placed on the technician home page. At Block 750 the TSMC sends a 999 numeric page using the IDS paging function, and at Block 760, the TSMC sends a message to the wireless laptops using the IDS messaging. The IDS message may include the updated information and the technician home page URL. At Block 770, if the technician has additional interest then the technician logs on to the technician home page at Block 780.

Figure 8:
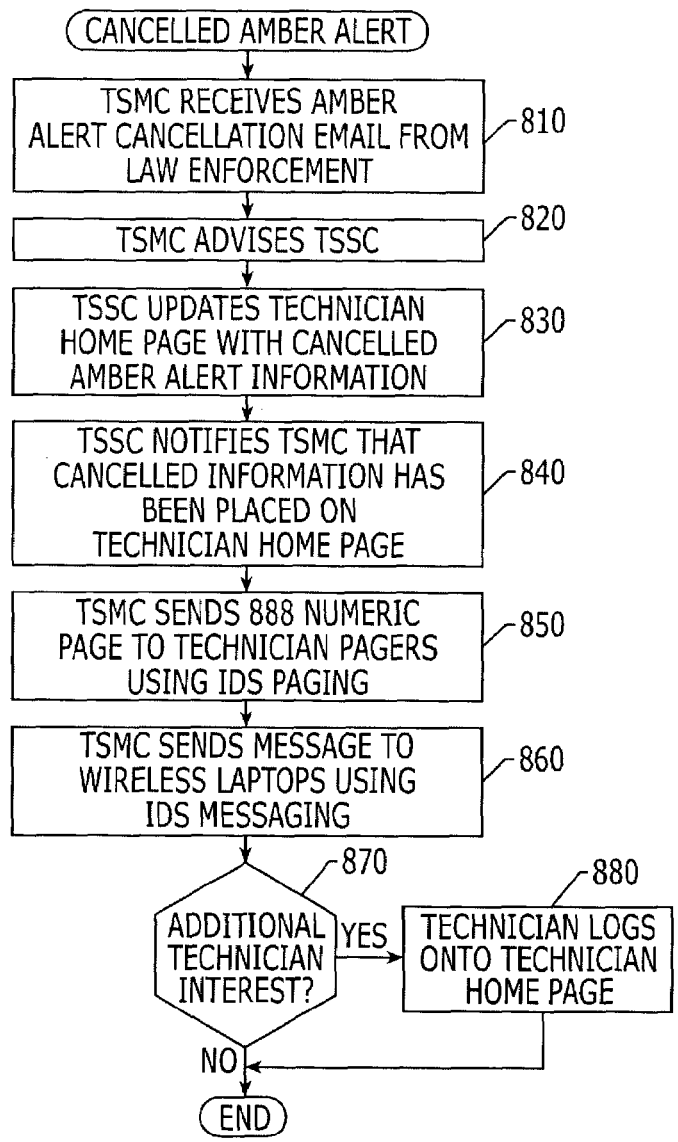

FIG. 8 is a flowchart of operations that may be performed to cancel an AMBER alert according to embodiments of the present invention. These operations may be performed by systems, methods and/or computer program products of FIGS. 1–5. As shown in FIG. 8, the TSMC receives an AMBER alert cancellation email from law enforcement at Block 810 and the TSMC advises the TSSC at Block 820. The TSSC updates the technician home page with the cancelled alert information at Block 830 and the TSSC notifies the TSMC that the cancelled information has been placed on the technician home page. At Block 850, the TSMC sends an "888" numeric page or an "888_amber" alphanumeric page to the technician pagers using IDS paging. At Block 860, the TSMC sends a message to the wireless laptops using IDS messaging. The message can include the cancelled information and present page URL. At Block 870 if the technician desires additional information, the technician logs on to the technician home page at Block 680.

Additional discussion of systems, methods and computer program products according to embodiments of the present invention will now be provided. Screen shots that may be used in a wireless terminal 120, 120', 120" or 580 and on a technician home page 250, 250' or 540, according to embodiments of the invention, also will be provided.

Figure 9:
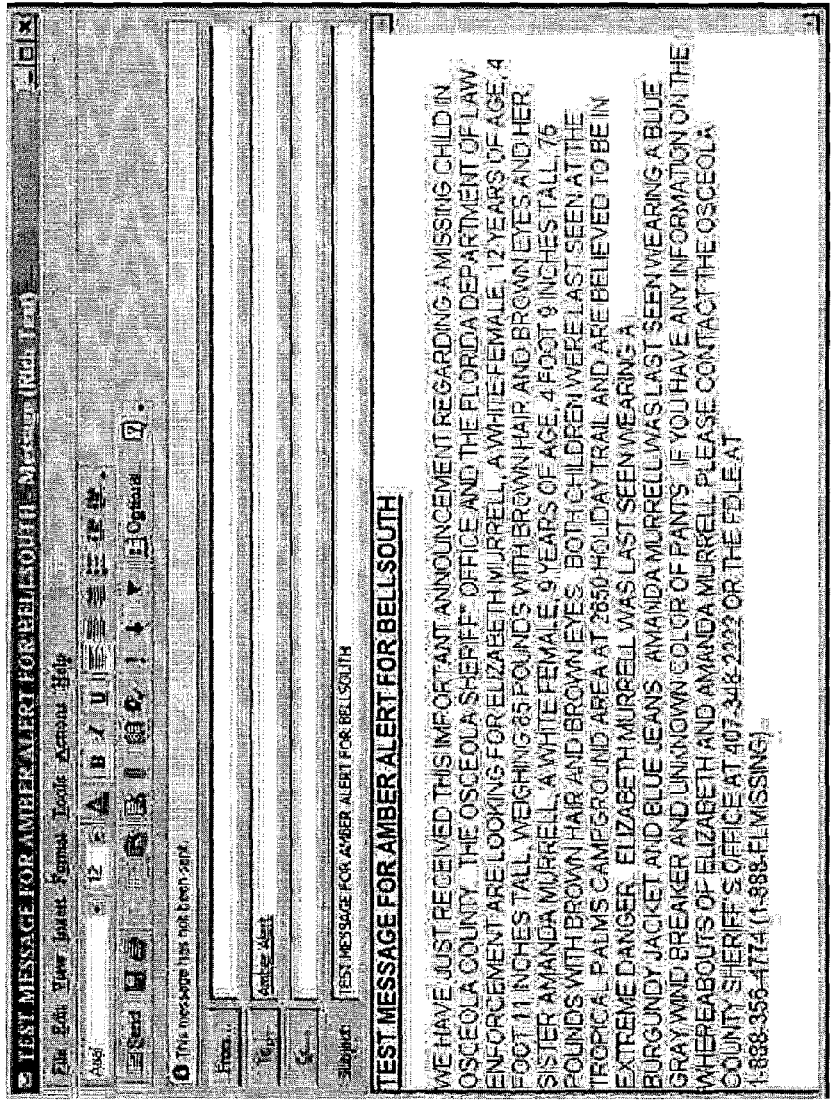
FIGS. 9–15 are screen shots of various graphical user interfaces that may be used according to various embodiments of the present invention.
Figure 10:
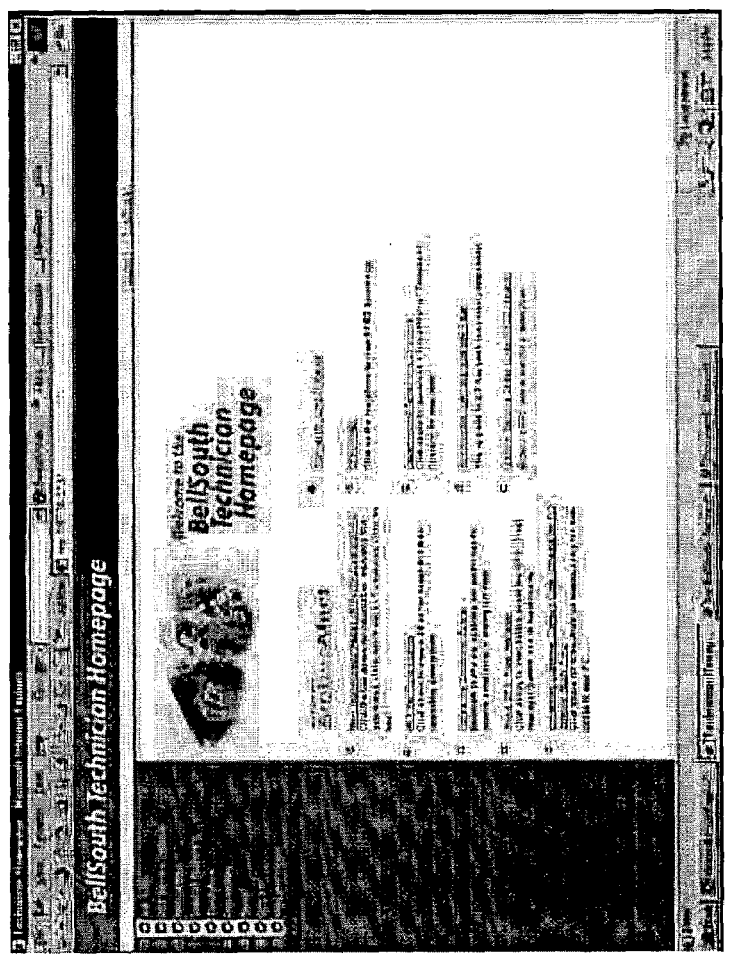
Figure 11:
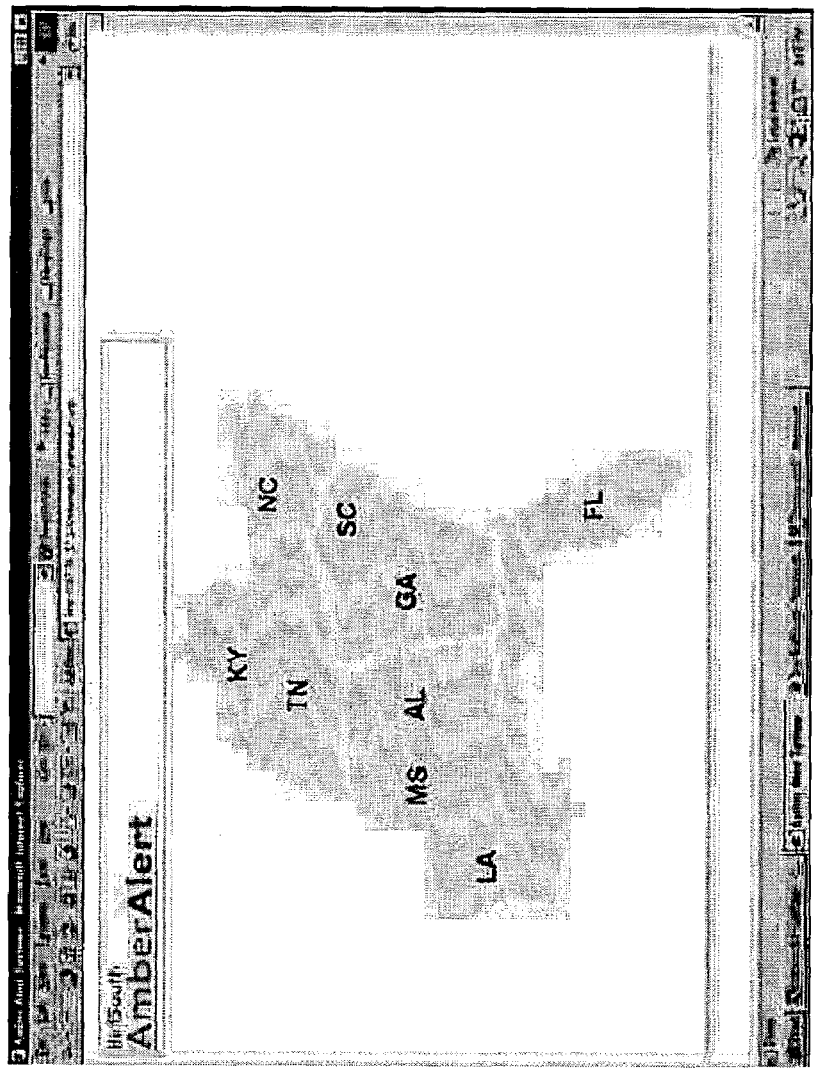
Figure 12:
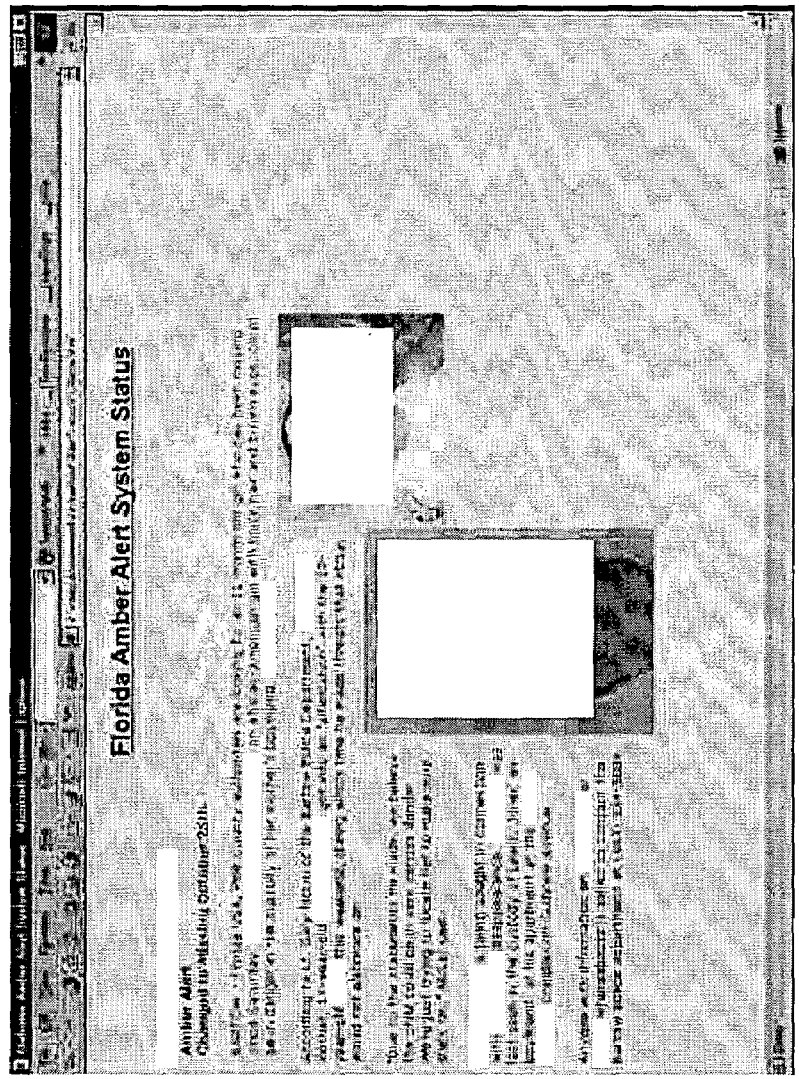

As was described extensively above, an AMBER alert notification may be obtained by the mobile workforce dispatch system as an email message from law enforcement authorities. A screen shot of an AMBER alert message that may be obtained from law enforcement authorities is shown in FIG. 9. As was also described extensively above, a mobile workforce website may be updated to place the AMBER alert thereon. For example, FIG. 10 illustrates a technician home page which includes an AMBER alert link thereon. Upon selecting the AMBER alert link, a map of FIG. 11 may be provided to allow the technician to select the technician state. Upon selection of the state, the AMBER alert of FIG. 12 may be displayed. In FIG. 12, the photographs have been partly concealed and the names have been concealed for privacy.

The AMBER alert message on the technician home page (FIG. 12) may correspond identically to the AMBER alert email message that was obtained from law enforcement authorities (FIG. 9) in some embodiments. In other embodiments, personnel at the TSMC or elsewhere may manually compose a new AMBER alert message in a predetermined format based on the email message that is received from law enforcement authorities. In still other embodiments, the email message that is received from law enforcement authorities may be automatically converted into a predetermined format of an AMBER alert message that is placed on the technician home page. Accordingly, manual and/or automatic conversion of the AMBER alert email message that is obtained from law enforcement authorities to the AMBER alert message on the technician home page may be provided.

Figure 13:
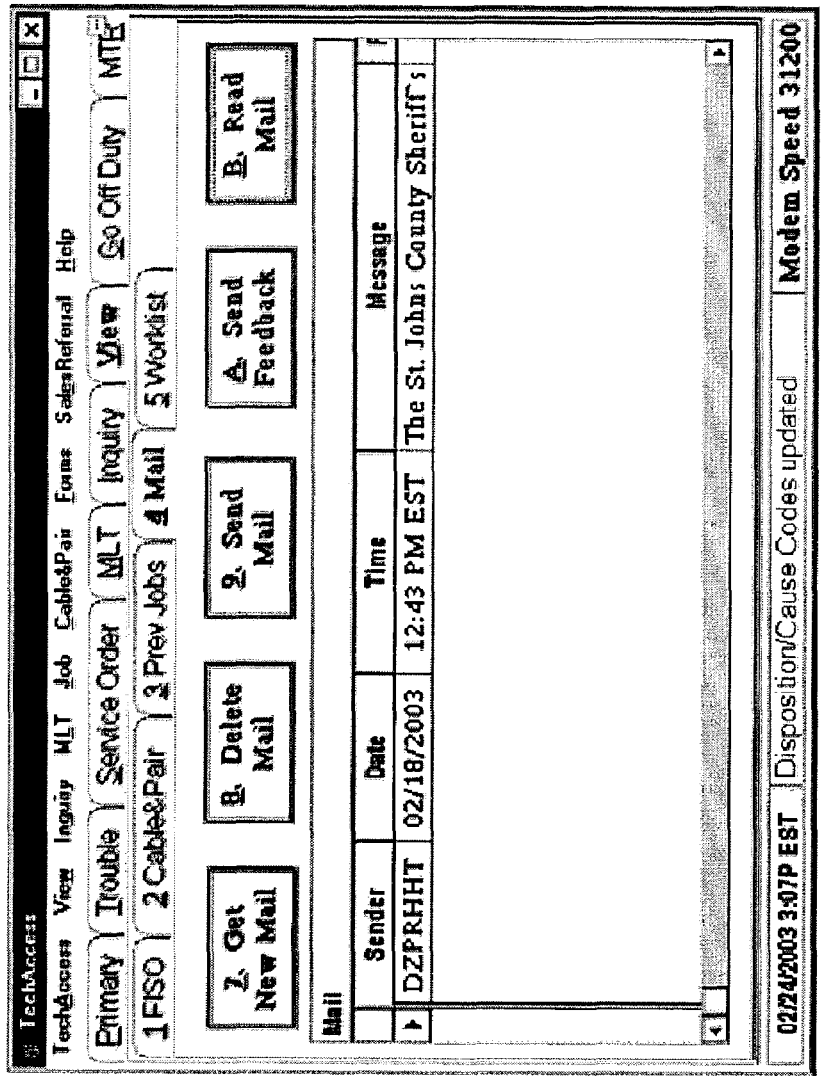
Figure 14:
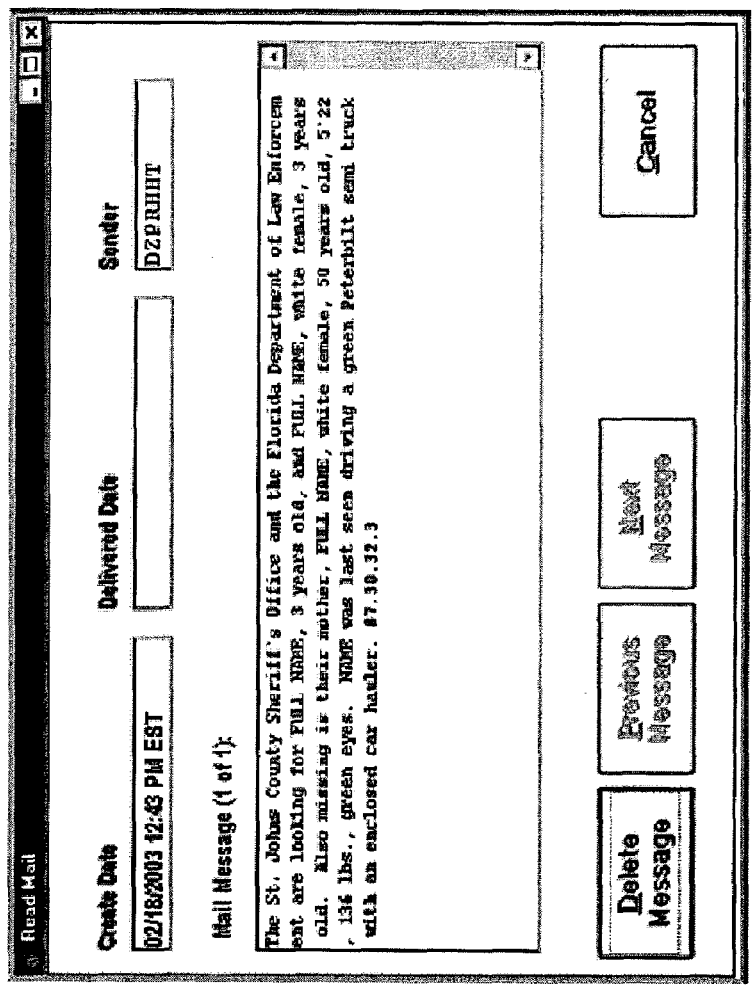

As was also described extensively above, a mobile workforce AMBER alert message may be sent to the plurality of wireless terminals in response to the AMBER alert. A computerized automated voice message or other mechanism may inform the technician that new mail is present, in some embodiments. FIG. 13 illustrates an example of a mobile workforce AMBER alert message that is received as a "new mail" message or a special AMBER alert message. FIG. 14 illustrates an example of a mobile workforce AMBER alert that may be displayed on the wireless terminal.

As was described above, the mobile workforce AMBER alert message (FIG. 14) may be generated automatically and/or manually from the email that is received from law enforcement authorities (FIG. 9) by personnel of the TSMC and/or others. The mail message may be delivered the next time the technician closes, returns or gets a new job. The technician can then take the opportunity to access the technician home page (FIG. 10). This may be done by logging in to the technician home page using a landline (wired) connection. The AMBER alert on the technician home page (FIG. 12) can include the telephone number of the law enforcement agency that should be contacted in the event the individuals or vehicles described in the alert are observed.

It will be understood that the technician role in the AMBER alert network is that of supplying additional awareness and support for an effective community service program. Generally, technician should avoid anything that would be dangerous to their person or their equipment as well as any personal involvement beyond simply alerting law enforcement agencies. Moreover, accessing the technician home page to view the entire AMBER alert should be performed at the next available opportunity rather than disrupting normal work duties.

In other embodiments of the present invention, a work management center ("WMC") management team, which is responsible for managing the mobile workforce, also may be notified of the AMBER alert via the IDS 430. The WMC can provide additional awareness and support and/or provide detailed information to technician who are unable to view the technician home page.

Figure 15:
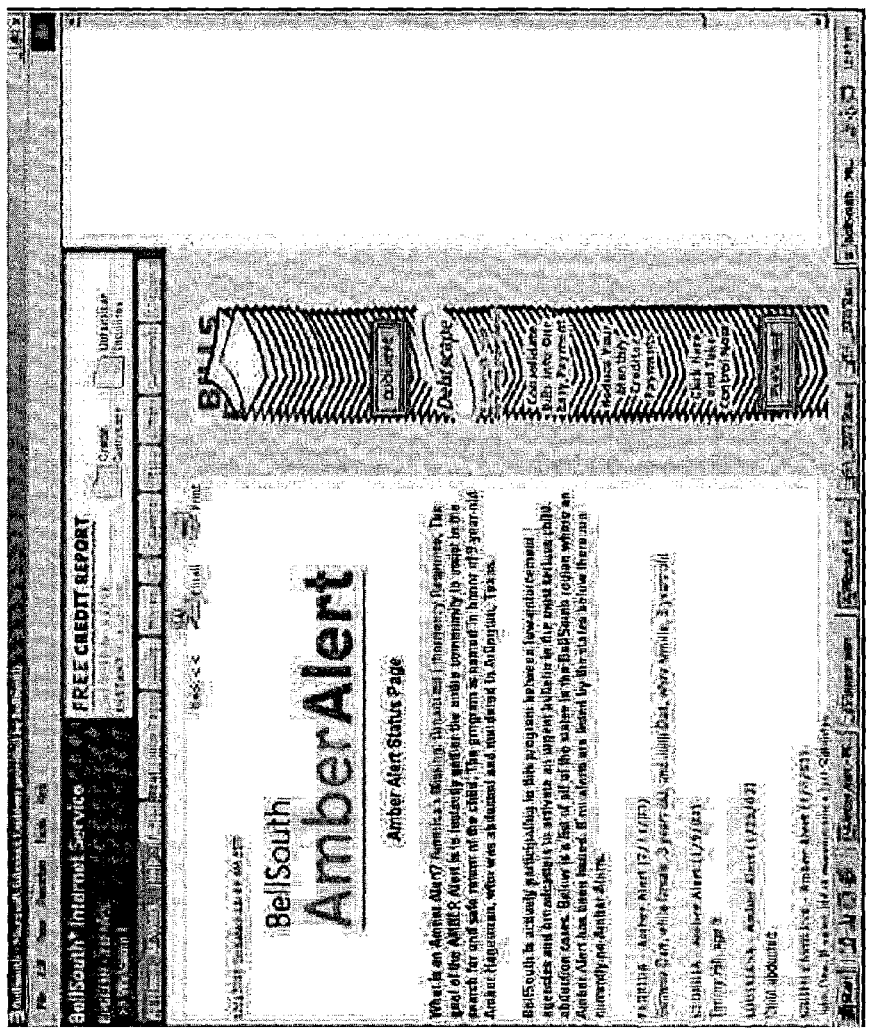

In still other embodiments, the TSMC staff and/or others can also send an AMBER alert message to a website that is available to individuals or entities other than the mobile workforce. An example is shown in FIG. 15. This website may post the information to let customers or others know that the alert has been issued. In some embodiments, the alert may be left on this site for 24 hours and treated the same as a breaking news story.

Accordingly, embodiments of the present invention can allow an AMBER alert to be efficiently broadcast to a mobile workforce. The mobile workforce may be in an ideal position to provide the authorities with information to resolve the AMBER alert.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A mobile workforce communication system for a commercial business with a mobile sales and/or service workforce comprising:
   a mobile workforce dispatch system that is configured to dispatch the mobile workforce of the commercial business to perform sales and/or service tasks for the commercial business; and
   a plurality of wireless terminals that are carried by the mobile workforce of the commercial business and are configured to communicate with the mobile workforce dispatch system to allow the mobile workforce to respond to dispatches to perform the sales and/or service tasks for the commercial business;
   the mobile workforce dispatch system being further configured to accept an AMBER alert notification and to broadcast a mobile workforce AMBER alert message that comprises a description of an abductee and an identification of a location of an abduction, to the plurality of wireless terminals in response thereto so that the mobile workforce can be apprised of an AMBER alert while performing sales and/or service tasks for the commercial business;
   wherein the mobile workforce dispatch system further comprises a mobile workforce website that is accessible by the mobile workforce to assist the mobile workforce in performing the sales and/or service tasks for the commercial business,
   wherein the mobile workforce AMBER alert message further comprises an identification of the mobile workforce website and wherein the mobile workforce website is further configured to allow the mobile workforce to access the mobile workforce website from the plurality of wireless terminals in response to the mobile workforce AMBER alert message to obtain additional information concerning the AMBER alert.

2. A mobile workforce communication system according to claim 1 wherein the mobile workforce website is further configured to allow the mobile workforce to access the mobile workforce website using a wire connection from the plurality of wireless terminals in response to the mobile workforce AMBER alert message to obtain additional information concerning the AMBER alert.

3. A mobile workforce communication system according to claim 1 wherein the additional information concerning the AMBER alert comprises an image of the abductee.

4. A mobile workforce communication system according to claim 1 wherein the plurality of wireless terminals comprise wireless laptop computers configured for Internet access, that are configured to communicate bidirectionally with the mobile workforce dispatch system.

5. A mobile workforce communication system according to claim 1 wherein the mobile workforce dispatch system is configured to accept an AMBER alert notification that relates to a governmental jurisdiction and is further configured to broadcast a mobile workforce AMBER alert message only to selected ones of the plurality of wireless terminals that are located in the governmental jurisdiction.

6. A mobile workforce communication system according to claim 1 wherein the mobile workforce dispatch system is configured to accept an AMBER alert email message from a law enforcement authority and is further configured to convert the AMBER alert email message into the mobile workforce AMBER alert message.

7. A mobile workforce communication system according to claim 6 wherein the mobile workforce dispatch system includes a Technician Systems Monitoring Center (TSMC)

and wherein the TSMC is configured to accept the AMBER alert email message from a law enforcement authority and is further configured to convert the AMBER alert email message into the mobile workforce AMBER alert message.

8. A mobile workforce communication system according to claim 1 wherein the mobile workforce dispatch system is further configured to accept an AMBER alert cancellation notification and to broadcast an AMBER alert cancellation message to the plurality of wireless terminals in response thereto.

9. A mobile workforce communication system according to claim 1 further comprising a plurality of pagers that are carried by the mobile workforce and that are configured to receive paging codes from the mobile workforce dispatch system, the mobile workforce dispatch system being further configured to broadcast an AMBER alert paging code to the plurality of pagers in response to receipt of the AMBER alert notification.

10. A mobile workforce communication system according to claim 1 wherein the mobile workforce dispatch system comprises a dispatch system control center that is configured to accept an AMBER alert notification, a messaging system that is responsive to the dispatch control center to distribute the mobile workforce AMBER alert message and a mobile terminal gateway that is responsive to the messaging system to communicate the mobile workforce AMBER alert message to the plurality of wireless terminals.

11. A mobile workforce system for a commercial business having a mobile sales and/or service workforce comprising:
a mobile workforce communication system; and
a plurality of wireless terminals that are carried by the mobile workforce of the commercial business and are configured to communicate with the mobile workforce communication system, to allow the mobile workforce to perform sales and/or service tasks for the commercial business;
the mobile workforce communication system being further configured to accept an AMBER alert notification and to broadcast a mobile workforce AMBER alert message that comprises a description of an abductee and an identification of a location of an abduction, to the plurality of wireless terminals in response thereto so that the mobile workforce of the commercial business can be apprised of an AMBER alert while performing the sales and/or service tasks for the commercial business;
wherein the mobile workforce communication system further comprises a mobile workforce website that is accessible by the mobile workforce, wherein the mobile workforce AMBER alert message further comprises an identification of the mobile workforce website and wherein the mobile workforce website is further configured to allow the mobile workforce to access the mobile workforce website from the plurality of wireless terminals in response to the mobile workforce AMBER alert message to obtain additional information concerning the AMBER alert while performing the sales and/or service tasks for the commercial business. configured to allow the mobile workforce to access the mobile workforce website from the plurality of wireless terminals in response to the mobile workforce AMBER alert message to obtain additional information concerning the AMBER alert.

12. A mobile workforce system according to claim 11 wherein the additional information concerning the AMBER alert comprises an image of the abductee.

13. A mobile workforce system according to claim 11 wherein the mobile workforce communication system is configured to accept an AMBER alert notification that relates to a governmental jurisdiction and is further configured to broadcast a mobile workforce AMBER alert message only to selected ones of the plurality of wireless terminals that are located in the governmental jurisdiction.

14. A mobile workforce system according to claim 11 wherein the mobile workforce communication system is further configured to accept an AMBER alert cancellation notification and to broadcast an AMBER alert cancellation message to the plurality of wireless terminals in response thereto.

15. A mobile workforce wireless terminal for a mobile sales and/or service workforce of a commercial business comprising:
means for wirelessly communicating with a mobile workforce communication system of the commercial business to allow the mobile sales and/or service workforce of the commercial business to perform sales and/or service tasks for the commercial business;
means for receiving a mobile workforce AMBER alert message that comprises a description of an abductee and an identification of a location of an abduction, from the mobile workforce communication system so that the mobile workforce of the commercial business can be prised of an AMBER alert while performing the sales and/or service tasks for the commercial business;
means for accessing a mobile workforce website in response to receipt of the mobile workforce AMBER alert message to obtain additional information concerning the AMBER alert.

16. A mobile workforce wireless terminal according to claim 15 wherein the means for accessing comprises means for accessing the mobile workforce website using a wire connection.

17. A mobile workforce wireless terminal according to claim 15 wherein the means for wirelessly communicating and the means for receiving are included in a wireless laptop computer.

18. A method of operating a mobile workforce communication system for a commercial business with a mobile sales and/or service workforce that includes a mobile workforce dispatch system that is configured to dispatch the mobile workforce of the commercial business to perform sales and/or service tasks for the commercial business and a plurality of wireless terminals that are carried by the mobile workforce of the commercial business and are configured to communicate with the mobile workforce dispatch system to allow the mobile workforce to respond to dispatches to perform the sales and/or service tasks for the commercial business, the method comprising:
accepting an AMBER alert notification at the mobile workforce dispatch system; and
broadcasting a mobile workforce AMBER alert message that comprises a description of an abductee and an identification of a location of an abduction, to the plurality of wireless terminals in response thereto so that the mobile workforce can be apprise of an AMBER alert while performing the sales and/or service tasks forte commercial business;
wherein the mobile workforce dispatch system further comprises a mobile workforce website that is accessible by the mobile workforce to assist the mobile workforce in performing the sales and/or service tasks for the commercial business, wherein the mobile workforce AMBER alert message further comprises an identification of the mobile workforce website and wherein the method further comprises:
accessing the mobile workforce website from the plurality of wireless terminals in response to the mobile workforce AMBER alert message to obtain additional information concerning the AMBER alert.
accessing the mobile workforce website from the plurality of wireless terminals in response to the mobile workforce AMBER alert message to obtain additional information concerning the AMBER alert.

19. A method according to claim 18 wherein the additional information concerning the AMBER alert comprises an image of the abductee.

20. A method according to claim 18 wherein the accepting comprises accepting an AMBER alert notification that relates to a governmental jurisdiction, and
wherein the broadcasting comprises broadcasting a mobile workforce AMBER alert message only to selected ones of the plurality of wireless terminals that are located in the governmental jurisdicton.

21. A method according to claim 18 wherein the accepting comprises:
accepting an AMBER alert email message from a law enforcement authority; and
converting the AMBER alert email message into the mobile workforce AMBER alert message.

22. A method according to claim 18 further comprising:
accepting an AMBER alert cancellation notification at the mobile workforce dispatch system; and
broadcasting an AMBER alert cancellation message to the plurality of wireless terminals in response thereto.

23. A method according to claim 18 further comprising:
broadcasting an AMBER alert paging code from the mobile workforce dispatch system to a plurality of pagers in response to receipt of the AMBER alert notification.

24. A method of operating a mobile workforce system for a mobile sales and/or service workforce of a commercial business that includes a mobile workforce communication system and a plurality of wireless terminals that are carried by the mobile workforce of the commercial business and are configured to communicate with the mobile workforce communication system to allow the mobile sales and/or service workforce of the commercial business to perform sales and/or service tasks for the commercial business, the method comprising:
accepting an AMBER alert notification at the mobile workforce communication system; and
broadcasting a mobile workforce AMBER alert message that comprises a description of an abductee and an identification of a location of an abduction, to the plurality of wireless terminals in response thereto so that the mobile workforce of the commercial business can be apprised of an AMBER alert while performing the sales and/or service tasks for the commercial business;
wherein the mobile workforce communication system further comprises a mobile workforce website that is accessible by the mobile workforce, wherein the mobile workforce AMBER alert message further comprises an identification of the mobile workforce website and wherein the method further comprises:
accessing the mobile workforce website from the plurality of wireless terminals in response to the mobile workforce AMBER alert message to obtain additional information concerning the AMBER alert while performing the sales and/or service tasks for the commercial business.

25. A method according to claim 24 wherein the additional information concerning the AMBER alert comprises an image of the abductee.

26. A method according to claim 24 wherein the accepting comprises accepting an AMBER alert notification that relates to a governmental jurisdiction and wherein the broadcasting comprises broadcasting a mobile workforce AMBER alert message only to selected ones of the plurality of wireless terminals that are located in the governmental jurisdiction.

27. A method according to claim 24 further comprising:
accepting an AMBER alert cancellation notification at the mobile workforce communication system; and
broadcasting an AMBER alert cancellation message to the plurality of wireless terminals in response thereto.

28. A method of operating a mobile workforce wireless terminal for a mobile sales and/or service workforce of a commercial business comprising:
wirelessly communicating with a mobile workforce communication system of the commercial business to allow the mobile sales and/or service workforce of the commercial business to perform sales and/or service tasks for the commercial business; and
receiving a mobile workforce AMBER alert message that comprises a description of an abductee and an identification of a location of an abduction, from the mobile workforce communication system so that the mobile workforce of the commercial business can be apprised of an AMBER alert while performing the sales and/or service tasks for the commercial business;
accessing a mobile workforce website in response to receipt of the mobile workforce AMBER alert message to obtain additional information concerning the AMBER alert.

29. A computer program product that is configured to operate a mobile workforce communication system for a commercial business with a mobile sales and/or service workforce that includes a mobile workforce dispatch system that is configured to dispatch the mobile workforce of the commercial business to perform sales and/or service tasks for the commercial business and a plurality of wireless terminals that are carried by the mobile workforce and are configured to communicate with the mobile workforce dispatch system to allow the mobile workforce to respond to dispatches to perform the sales and/or service tasks for the commercial business, the computer program product comprising computer usable storage medium having computer-readable program code embodied in the medium, the computer-readable program code comprising:
computer-readable program code that is configured to accept an AMBER alert notification at the mobile workforce dispatch system; and
computer-readable program code that is configured to broadcast a mobile workforce AMBER alert message that comprises a description of an abductee and an identification of a location of an abduction, to the plurality of wireless terminals in response thereto so that the mobile workforce can be apprised of an AMBER alert while performing the sales and/or service tasks for the commercial business;
wherein the mobile workforce dispatch system further comprises a mobile workforce website that is accessible by the mobile workforce to assist the mobile workforce in performing the sales and/or service tasks for the commercial business, wherein the mobile workforce AMBER alert message further comprises an identification of the mobile workforce website and wherein the computer program product further comprises:

computer-readable program code that is configured to access the mobile workforce website from the plurality of wireless terminals in response to the mobile workforce AMBER alert message to obtain additional information concerning the AMBER alert.

30. A computer program product according to claim 29 wherein the additional information concerning the AMBER alert comprises an image of the abductee.

31. A computer program product according to claim 29 wherein the computer-readable program code that is configured to accept comprises computer-readable program code that is configured to accept an AMBER alert notification that relates to a governmental jurisdiction and wherein the computer-readable program code that is configured to broadcast comprises computer-readable program code that is configured to broadcast a mobile workforce AMBER alert message only to selected ones of the plurality of wireless terminals that are located in the governmental jurisdiction.

32. A computer program product according to claim 29 wherein the computer-readable program code that is configured to accept comprises:

computer-readable program code that is configured to accept an AMBER alert email message from a law enforcement authority; and computer-readable program code that is configured to convert the AMBER alert email message into the mobile workforce AMBER alert message.

33. A computer program product according to claim 29 further comprising:

computer-readable program code that is configured to accept an AMBER alert cancellation notification at the mobile workforce dispatch system; and computer-readable program code that is configured to broadcast an AMBER alert cancellation message to the plurality of wireless terminals in response thereto.

34. A computer program product according to claim 29 further comprising:

computer-readable program code that is configured to broadcast an AMBER alert paging code from the mobile workforce dispatch system to a plurality of pagers in response to receipt of the AMBER alert notification.

35. A computer program product that is configured to operate a mobile workforce system for a commercial business with a mobile sales and/or service workforce that includes a mobile workforce communication system and a plurality of wireless terminals that are carried by the mobile workforce of the commercial business and are configured to communicate with the mobile workforce communication system to allow the mobile workforce of the commercial business to perform sales and/or service tasks for the commercial business, the computer program product comprising computer usable storage medium having computer-readable program code embodied in the medium, the computer-readable program code comprising:

computer-readable program code that is configured to accept an AMBER alert notification at the mobile workforce communication system; and computer-readable program code that is configured to broadcast a mobile workforce AMBER alert message that comprises a description of an abductee and an identification of a location of an abductions to the plurality of wireless terminals in response thereto so that the mobile workforce of the commercial business can be apprised of an AMBER alert while performing the sales and/or service tasks for the commercial business;

wherein the mobile workforce communication system further comprises a mobile workforce website that is accessible by the mobile workforce, wherein the mobile workforce AMBER alert message further comprises an identification of the mobile workforce website and wherein the computer program product further comprises:

computer-readable program code that is configured to access the mobile workforce website from the plurality of wireless terminals in response to the mobile workforce AMBER alert message to obtain additional information concerning the AMBER alert.

36. A computer program product according to claim 35 wherein the additional information concerning the AMBER alert comprises an image of the abductee.

37. A computer program product according to claim 35 wherein the computer-readable program code that is configured to accept comprises computer-readable program code that is configured to accept an AMBER alert notification that relates to a governmental jurisdiction and wherein the computer-readable program code that is configured to broadcast comprises computer-readable program code that is configured to broadcast a mobile workforce AMBER alert message only to selected ones of the plurality of wireless terminals that are located in the governmental jurisdiction.

38. A computer program product according to claim 35 further comprising:

computer-readable program code that is configured to accept an AMBER alert cancellation notification at the mobile workforce communication system; and computer-readable program code that is configured to broadcast an AMBER alert cancellation message to the plurality of wireless terminals in response thereto.

39. A computer program product that is configured to operate a mobile workforce wireless terminal for a mobile sales and/or service workforce of a commercial business, the computer program product comprising computer usable storage medium having computer-readable program code embodied in the medium, the computer-readable program code comprising:

computer-readable program code that is configured to wirelessly communicate with a mobile workforce communication system of the commercial business to allow the mobile sales and/or service workforce of the commercial business to perform sales and/or service tasks for the commercial business;

computer-readable program code that is configured to receive a mobile workforce AMBER alert message that comprises a description of an abductee and an identification of a location of an abduction from the mobile workforce communication system so that the mobile workforce of the commercial business can be apprised of an AMBER alert while performing the sales and/or service tasks for the commercial business;

computer-readable program code that is configured to access a mobile workforce website in response to receipt of the mobile workforce AMBER alert message to obtain additional information concerning the AMBER alert.

* * * * *

UNITED STATES PATENT AND TRADEMARK OFFICE
CERTIFICATE OF CORRECTION

| | | |
|---|---|---|
| PATENT NO. | : 7,142,892 B2 | Page 1 of 1 |
| APPLICATION NO. | : 10/388335 | |
| DATED | : November 28, 2006 | |
| INVENTOR(S) | : Gary J. Dennis et al. | |

It is certified that error appears in the above-identified patent and that said Letters Patent is hereby corrected as shown below:

Column 11, lines 59-63, delete "configured to allow the mobile workforce to access the mobile workforce website from the plurality of wireless terminals in response to the mobile workforce AMBER alert messages to obtain additional information concerning the AMBER alert."

Column 12, line 27, "prised" should be --apprised--.

Column 12, line 62, "forte" should be --for the--.

Signed and Sealed this

Thirteenth Day of March, 2007

JON W. DUDAS
*Director of the United States Patent and Trademark Office*